United States Patent
Zhang et al.

(10) Patent No.: US 12,223,690 B2
(45) Date of Patent: Feb. 11, 2025

(54) FACE CLUSTERING METHOD AND APPARATUS, CLASSIFICATION STORAGE METHOD, MEDIUM AND ELECTRONIC DEVICE

(71) Applicant: BOE TECHNOLOGY GROUP CO., LTD., Beijing (CN)

(72) Inventors: Wenhao Zhang, Beijing (CN); Hanwen Liu, Beijing (CN); Jingtao Xu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 372 days.

(21) Appl. No.: 17/773,123

(22) PCT Filed: Mar. 18, 2021

(86) PCT No.: PCT/CN2021/081539
§ 371 (c)(1),
(2) Date: Apr. 29, 2022

(87) PCT Pub. No.: WO2022/193232
PCT Pub. Date: Sep. 22, 2022

(65) Prior Publication Data
US 2023/0245421 A1     Aug. 3, 2023

(51) Int. Cl.
*G06V 10/762* (2022.01)
*G06V 10/74* (2022.01)
(Continued)

(52) U.S. Cl.
CPC .......... *G06V 10/763* (2022.01); *G06V 10/761* (2022.01); *G06V 10/776* (2022.01); *G06V 10/98* (2022.01); *G06V 40/172* (2022.01)

(58) Field of Classification Search
CPC .... G06V 40/172; G06V 40/16; G06V 40/174; G06V 40/166; G06V 40/173;
(Continued)

(56) References Cited

U.S. PATENT DOCUMENTS

2015/0117772 A1* 4/2015 Yang .................. G06F 16/7837
382/168
2019/0146991 A1   5/2019 Sato
(Continued)

FOREIGN PATENT DOCUMENTS

| CN | 102509084 A | 6/2012 |
| CN | 102752479 A | 10/2012 |

(Continued)

OTHER PUBLICATIONS

An Evaluation of Video-to-Video Face Verification (Year: 2010).*
(Continued)

*Primary Examiner* — Nizar N Sivji
(74) *Attorney, Agent, or Firm* — HOUTTEMAN LAW LLC

(57) ABSTRACT

Disclosed are face clustering method and apparatus, image classification storage method, computer-readable storage medium and electronic device. The face clustering method includes: clustering to-be-clustered images, including: acquiring similarity threshold corresponding to quantity level of current image categories in image category library, at least two quantity levels corresponding to different similarity thresholds; judging, according to current similarity threshold and similarity between each to-be-clustered face image and at least one image category in image category library, whether there is image of same category as to-be-clustered face image in image category library; determining, when there is image of same category as to-be-clustered face image, category label of the to-be-clustered face image (Continued)

according to category label of image of same category as to-be-clustered face image; and assigning, when there is no image of same category as to-be-clustered face image, category label to the to-be-clustered face image according to first preset rule.

19 Claims, 4 Drawing Sheets

(51) Int. Cl.
  *G06V 10/776* (2022.01)
  *G06V 10/98* (2022.01)
  *G06V 40/16* (2022.01)
(58) Field of Classification Search
  CPC .... G06V 40/169; G06V 10/76; G06V 10/763; G06V 10/761; G06V 10/776; G06V 10/98; G06V 10/762; G06V 20/30
  See application file for complete search history.

(56) References Cited

U.S. PATENT DOCUMENTS

| | | | |
|---|---|---|---|
| 2021/0312163 A1* | 10/2021 | Zhao | ................... G06V 40/171 |
| 2022/0019764 A1* | 1/2022 | Zhao | ................... G06V 10/761 |

FOREIGN PATENT DOCUMENTS

| | | | | | |
|---|---|---|---|---|---|
| CN | 104573642 | A | * | 4/2015 | ......... G06K 9/00288 |
| CN | 108073948 | A | * | 5/2018 | |
| CN | 108280477 | A | * | 7/2018 | ......... G06K 9/00221 |
| CN | 108875834 | A | * | 11/2018 | ............. G06K 9/622 |
| CN | 109284675 | A | * | 1/2019 | ......... G06K 9/00268 |
| CN | 109426781 | A | | 3/2019 | |
| CN | 109977895 | A | | 7/2019 | |
| CN | 110347875 | A | | 10/2019 | |
| CN | 110968719 | A | | 4/2020 | |
| CN | 111079653 | A | | 4/2020 | |
| CN | 111104970 | A | | 5/2020 | |
| CN | 111242040 | A | | 6/2020 | |
| CN | 111311524 | A | | 6/2020 | |
| CN | 111654723 | A | | 9/2020 | |
| CN | 112329666 | A | * | 2/2021 | |
| CN | 112364688 | A | * | 2/2021 | ......... G06K 9/00221 |
| CN | 112613492 | B | * | 2/2022 | ......... G06K 9/00228 |
| CN | 115457050 | B | * | 6/2023 | |

OTHER PUBLICATIONS

Taile Peng, "Research on short video annotation based on shot and scene context," Doctoral Dissertation, Dec. 2015, Shanghai Univ., Shanghai, China. English Abstract.

* cited by examiner

FACE CLUSTERING METHOD AND APPARATUS, CLASSIFICATION STORAGE METHOD, MEDIUM AND ELECTRONIC DEVICE

TECHNICAL FIELD

The present disclosure relates to the field of image processing techniques, and specifically relates to a face clustering method and apparatus, an image classification storage method, a computer-readable storage medium and an electronic device.

BACKGROUND

The face clustering method is applicable to many scenarios. For example, in a mobile phone album, images of the same person may be clustered into a group by the image clustering method. However, current face clustering methods have relatively low clustering accuracy.

SUMMARY

To solve at least one of the problems in the existing art, the present disclosure provides a face clustering method and apparatus, an image classified storage method, a computer-readable storage medium and an electronic device.

In order to achieve the above objects, the present disclosure provides a face clustering method, including: acquiring and clustering a face image to be clustered, the clustering including:
- acquiring a similarity threshold corresponding to a quantity level of current image categories in an image category library; wherein at least two different quantity levels correspond to different similarity thresholds;
- acquiring a similarity between the face image to be clustered and an image of at least one image category in the image category library;
- judging, according to a current similarity threshold and the similarity, whether there is an image of the same category as the face image to be clustered is present in the image category library; determining, when there is the image of the same category as the face image to be clustered in the image category library, a category label of the face image to be clustered according to a category label of the image of the same category as the face image to be clustered; and assigning, when there is no image of the same category as the face image to be clustered in the image category library, the category label to the face image to be clustered according to a first preset rule.

In some embodiments, the similarity threshold is positively correlated with the quantity level of current image categories in the image category library.

In some embodiments, when there is no image of the same category as the face image to be clustered in the image category library, the clustering further includes:
- adding the face image to be clustered into the image category library.

In some embodiments, the acquiring the similarity threshold corresponding to the quantity level of current image categories in the image category library includes:
- judging whether the quantity level of image categories in the image category library is changed; adopting, when the quantity level of image categories in the image category library is not changed, a similarity threshold used when a previous face image to be clustered is clustered; and updating, when the quantity level of image categories in the image category library is changed, the similarity threshold according to the changed quantity level.

In some embodiments, each category in the image category library includes one image, and
the acquiring the similarity between the face image to be clustered and the image of at least one image category in the image category library and the judging whether there is the image of the same category as the face image to be clustered in the image category library according to the current similarity threshold and the similarity, specifically include:
- determining a comparison sequence of comparing images of respective image categories in the image category library with the face image to be clustered; and
- performing at least one comparison step according to the comparison sequence, wherein an $i^{th}$ comparison step includes: calculating a similarity between an image of an $i^{th}$ image category in the comparison sequence in the image category library and the face image to be clustered, and determining, when the similarity between the image of the $i^{th}$ image category in the comparison sequence in the image category library and the face image to be clustered is greater than or equal to the similarity threshold, the image of the $i^{th}$ image category in the comparison sequence in the image category library as the image of the same category as the face image to be clustered; and performing a next comparison step when the similarity between the image of the $i^{th}$ image category in the comparison sequence in the image category library and the face image to be clustered is less than the similarity threshold; i is an integer greater than zero and less than or equal to the quantity of current image categories in the image category library.

In some embodiments, the calculating the similarity between the image of the $i^{th}$ image category in the comparison sequence in the image category library and the face image to be clustered includes:
- acquiring a feature vector of the image of the $i^{th}$ image category in the comparison sequence in the image category library as a first feature vector;
- acquiring a feature vector of the face image to be clustered as a second feature vector; and
- determining, according to a similarity between the first feature vector and the second feature vector, the similarity between the image of the $i^{th}$ image category in the comparison sequence in the image category library and the face image to be clustered.

In some embodiments, a first quantity level corresponds to a category quantity of (0, 10000], and a similarity threshold of 0.3 to 0.6;
- a second quantity level corresponds to a category quantity in a range of (10000, 20000], and a similarity threshold in a range of 0.61 to 0.64;
- a third quantity level corresponds to a category quantity in a range of (20000, 30000], and a similarity threshold in a range of 0.65 to 0.664;
- a fourth quantity level corresponds to a category quantity in a range of (30000, 50000], and a similarity threshold in a range of 0.665 to 0.70; and
- a fifth quantity level corresponds to a category quantity in a range of (50000, ∞), and a similarity threshold in a range of 0.705 to 0.9.

In some embodiments, the category label includes a category serial number;

the assigning the category label to the face image to be clustered according to the first preset rule includes:
adding 1 to the quantity of current image categories in the image category library to obtain a category serial number of the face image to be clustered.

In some embodiments, the face clustering method further includes: establishing, before acquiring a first face image to be clustered, correspondence relations between different quantity levels and similarity thresholds;
wherein the establishing the correspondence relations between different quantity levels and similarity thresholds includes:
setting a plurality of test sets, each of which includes test images of a plurality of test image categories; wherein a quantity of the test image categories corresponds to different quantity levels in different test sets; and
for each of the test sets, performing steps of:
setting at least one test threshold;
clustering the test images in the test set based on each test threshold to obtain test clustering results of the test images, and determining a clustering error rate corresponding to the test threshold according to the test clustering result of each test image and a theoretical clustering result; and
acquiring a test threshold corresponding to a clustering error rate meeting a preset test condition, and taking the acquired test threshold as a similarity threshold corresponding to the quantity level of test image categories in the test set.

In some embodiments, the clustering error rate includes: a false accept rate and a false reject rate.

In some embodiments, the preset test condition includes a condition that the false reject rate is equal to the false accept rate.

In some embodiments, except for the test set corresponding to the highest quantity level, the quantity of test image categories in each of the remainder test sets is an upper limit value of the corresponding quantity level.

An embodiment of the present disclosure further provides an image classification storage method applied to an electronic device including an image capturing unit, the image classification storage method including:
in response to a first face image captured by the image capturing unit, taking the first face image as a face image to be clustered, and clustering the first face image by the face clustering method as described above to obtain a category label of the first face image.

In some embodiments, the image classification storage method further includes:
outputting the category label of the first face image.

In some embodiments, before the image capturing unit captures the first face image, a batch image set is stored in the electronic device; and
the image classification storage method further includes:
sequentially taking, before the image capturing unit captures the first face image, face images in the batch image set as the face image to be clustered to perform the clustering.

In some embodiments, the image classification storage method further includes:
updating, in response to a label update signal and based on a current similarity threshold, category labels of the clustered face images one by one.

In some embodiments, the updating the category label of any clustered face image includes, for each clustered face image:

judging, according to the current similarity threshold and a similarity between the face image with a label to be updated and an image of at least one face image category with an updated label, whether an image of the same category as the face image with a label to be updated is present in the face image category with an updated label; determining, when the image of the same category as the face image with a label to be updated is present in the face image category with an updated label, a new category label of the face image with a label to be updated according to a category label of the image of the same category as the face image with a label to be updated; and assigning, when the image of the same category as the face image with a label to be updated is not present in the face image category with an updated label, a new category label to the face image with a label to be updated according to a second preset rule;
the similarity threshold remains unchanged during update of category labels of the clustered face images one by one.

In some embodiments, the category label includes a category serial number;
category labels of the clustered face images are updated one by one according to a first sequence in which the clustered face images obtain category labels; and
the assigning the new category label to the face image with a label to be updated according to the second preset rule includes:
adding 1 to a total quantity of current face image categories with an updated label to obtain the new category label of the face image with a label to be updated.

An embodiment of the present disclosure further provides a face clustering apparatus, including: a memory and a processor, wherein the memory has a computer program stored thereon which, when executed by the processor, causes the face clustering method as described above to be implemented.

An embodiment of the present disclosure further provides a computer-readable storage medium having a computer program stored thereon which, when executed by a processor, causes the face clustering method or the image classification storage method as described above to be implemented.

An embodiment of the present disclosure further provides an electronic device, including:
an image capturing unit;
a memory and a processor, wherein the memory has a computer program stored thereon which, when executed by the processor, causes the image classification storage method as described above to be implemented.

BRIEF DESCRIPTION OF DRAWINGS

Accompanying drawings are provided for further understanding of this disclosure and constitute a part of the specification. Hereinafter, these drawings are intended to explain the present disclosure together with the following specific embodiments, but should not be considered as a limitation of the present disclosure. In the drawings.

DETAIL DESCRIPTION

To make the objects, technical solutions and advantages of the present disclosure clearer, the technical solutions in the embodiments of the present disclosure will now be described clearly and completely with reference to the accompanying drawings of the embodiments of the present disclosure. Apparently, the described embodiments are a part of, but not all, the embodiments of the present disclosure. Based on the described embodiments of the present disclosure, all the other embodiments obtained by those ordinary skilled in the art without any creative labor fall into the protection scope of the present disclosure.

Figure 1:
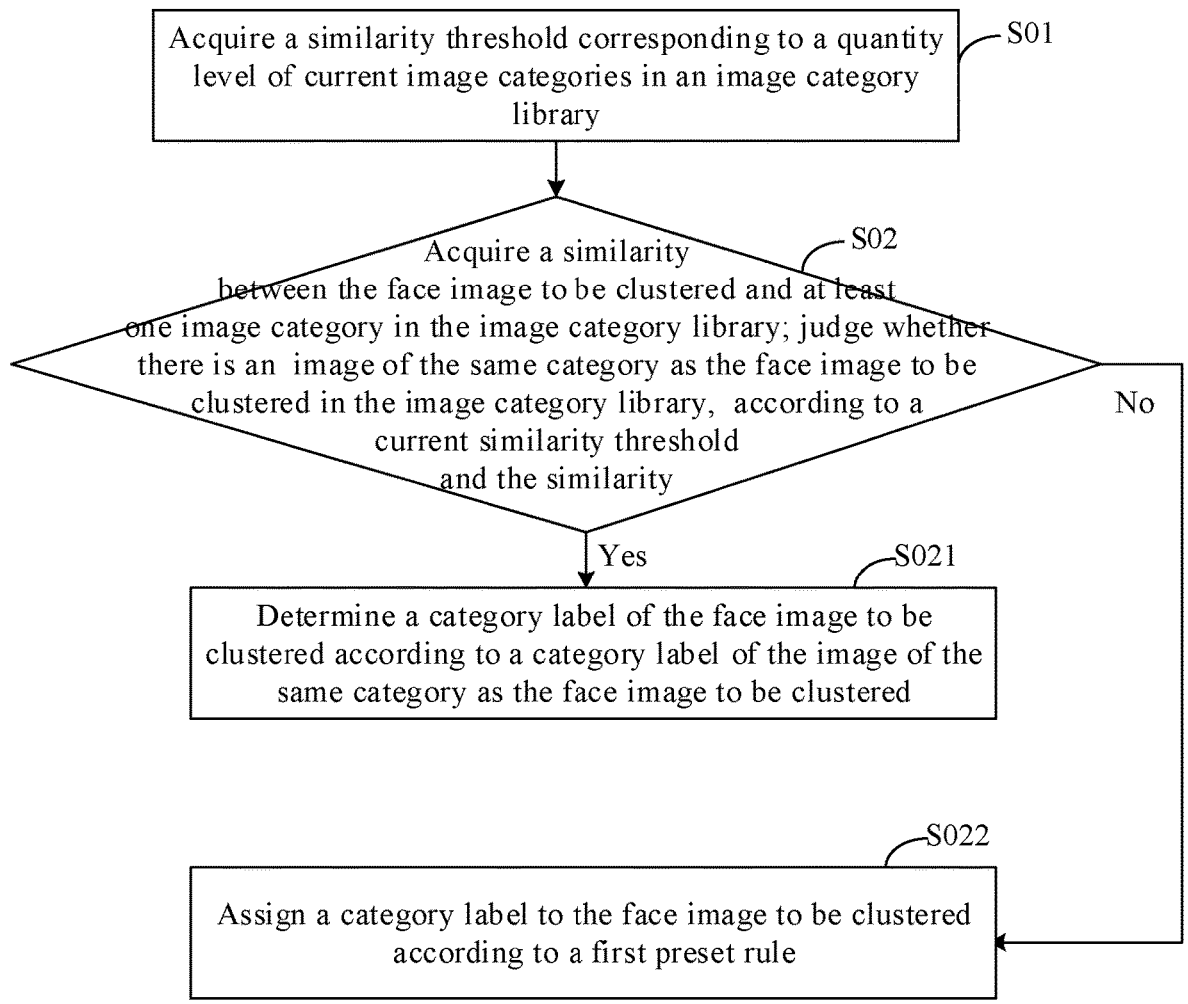
FIG. 1 is a schematic flowchart of clustering a face image to be clustered according to some embodiments of the present disclosure.

An embodiment of the present disclosure provides a face clustering method that may be executed based on a CPU. The face clustering method includes clustering the face image to be clustered, i.e., a process of determining categories of the face images to be clustered. FIG. 1 is a schematic flowchart of clustering face images to be clustered according to some embodiments of the present disclosure. As shown in FIG. 1, the clustering includes the following steps S01, S02, S021 and S022.

In step S01, a similarity threshold corresponding to a quantity level of current image categories in an image category library is acquired. At least two different quantity levels correspond to different similarity thresholds.

In some embodiments, similarity thresholds corresponding to at least two different quantity levels are positively correlated. In some embodiments, similarity thresholds corresponding to at least two adjacent quantity levels are positively correlated. In some embodiments, the similarity threshold is positively correlated with the current quantity level of current image categories in the image category library.

It should be noted that the quantity level indicates a magnitude of a total quantity of image categories in the image category library, and a higher level indicates a larger total quantity, or in other words, a higher level corresponds to a larger total quantity of image categories than a lower level. For example, when the total quantity of image categories is within a range of (0, 10000], the corresponding quantity level is a first quantity level; when the total quantity of image categories is within a range of (10000, 20000], the corresponding quantity level is a second quantity level; when the total quantity of image categories is within a range of (20000, 30000], the corresponding quantity level is a third quantity level; so on and so forth. It should be noted that one quantity level may correspond to one total quantity of image categories, and the total quantity of image categories may be a specific value (for example, 10000), or a value range (for example, a range of 10000 to 20000).

It should be further noted that before step S01, a mapping table may be acquired, and the mapping table contains quantity levels of categories and similarity thresholds corresponding to the quantity levels of categories.

In some embodiments, the images in the image category library are all face images, each image category may represent identity of a person, images of different persons belong to different categories, and images of the same person belong to the same category.

In step S02, a similarity between the face image to be clustered and an image(s) of at least one image category in the image category library is acquired, and it is judged, according to a current similarity threshold and the similarity, whether there is an image of the same category as the face image to be clustered in the image category library. When there is the image of the same category as the face image to be clustered in the image category library, it proceeds to step S021, that is, determining a category label of the face image to be clustered according to a category label of the image of the same category as the face image to be clustered. When there is no image of the same category as the face image to be clustered in the image category library, it proceeds to step S022, that is, assigning a category label to the face image to be clustered according to a first preset rule.

Each image category in the image category library may include one image, or may include a plurality of images. When acquiring a similarity between the face image to be clustered and one image category in the image category library, a similarity between each face image of the image category and the face image to be clustered may be acquired.

For example, each category in the image category library includes one image; and when the similarity between the face image to be clustered and a certain image category in the image category library is greater than the similarity threshold, the image of this image category is the image of the same category as the face image to be clustered. For another example, each category in the image category library includes a plurality of images; and when the similarities between the face image to be clustered and at least n images of an $m^{th}$ category in the image category library are all greater than the similarity threshold, images of this image category are images of the same category as the face image to be clustered. For example, n is an integer and is approximately half of the total quantity of images in the $m^{th}$ category.

The face image to be clustered may be an image in a batch image set. For example, the batch image set includes batch images stored in a device. Alternatively, the batch image set includes batch images downloaded from a network. Apparently, the face image to be clustered may also be an image captured by an image capturing unit such as a camera.

Each image in the image category library has a category label indicating the category to which the image belongs. The category label may be a category serial number or a category name. In an example, the category label includes a category serial number. For example, the category labels for multiple image categories in the image category library are: "00001", "00002", "00003", etc. In this case, the first preset rule includes, for example: adding 1 to the quantity of current image categories in the image category library to obtain a category serial number (i.e., a category label) of the face image to be clustered. For example, during clustering of the face image to be clustered, if there has been 9 image categories in the image category library, the category label of the face image to be clustered is determined to be "00010".

In the embodiments of the present disclosure, during clustering of each face image to be clustered, the similarity threshold is determined according to the quantity level of current image categories in the image category library, thereby improving accuracy of image clustering. For example, if the image categories currently in the image category library is less, the similarity threshold is set to a smaller value to reduce or prevent the situation where images of the same category are identified as different categories; and if the image categories currently in the image category library is more, the similarity threshold is set to a larger value to reduce or prevent the situation where images of different categories are identified as a same category. Therefore, the similarity threshold is adjusted according to the quantity of current image categories in the image category library, which can improve the accuracy of image clustering.

Figure 2:
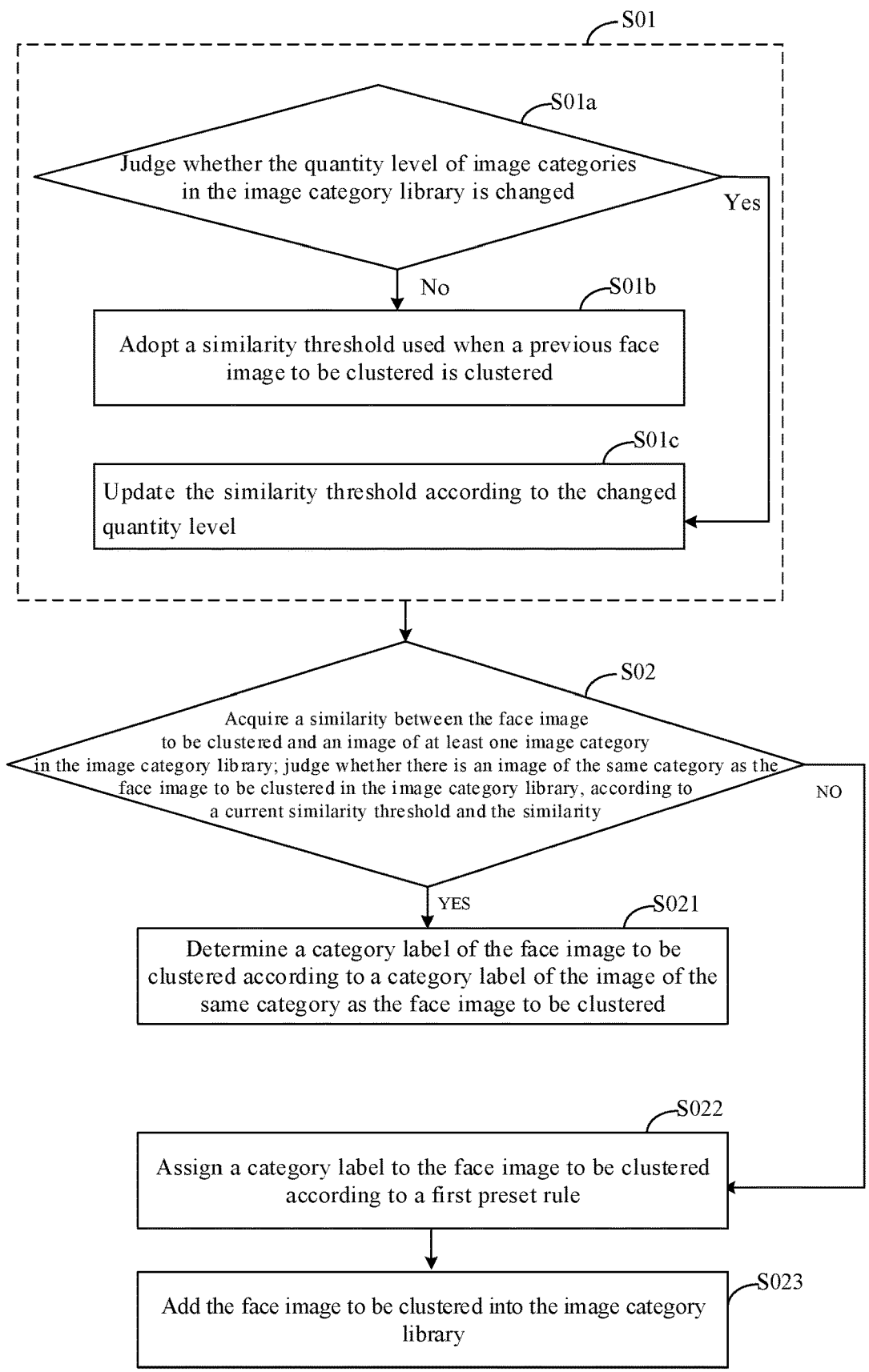
FIG. 2 is a schematic flowchart of clustering a face image to be clustered according to some other embodiments of the present disclosure.

FIG. 2 is a schematic flowchart of clustering a face image to be clustered according to some other embodiments of the present disclosure, and FIG. 2 is a specific implementation of FIG. 1. The description will be given taking an example in which each category in the image category library includes one image. As shown in FIG. 2, the clustering of each face image to be clustered includes the following steps S01, S02, S021-S023.

In step S01, a similarity threshold corresponding to a quantity level of current image categories in an image category library is acquired. The similarity threshold is positively correlated with the quantity level of current image categories in the image category library.

Step S01 specifically includes steps S01a to S01c.

In step S01a, it is judged whether the quantity level of image categories in the image category library is changed. When the quantity level of image categories in the image category library is not changed, it proceeds to step S01b, and when the quantity level of image categories in the image category library is changed, it proceeds to step S01c.

In step S01b, a similarity threshold used when a previous face image to be clustered is clustered is adopted.

In step S01c, the similarity threshold is updated according to the changed quantity level.

In some embodiments, a first quantity level corresponds to a category quantity in a range of (0, 10000] and a similarity threshold in a range of 0.3 to 0.6, such as 0.36 or 0.37 or 0.40. For another example, the first quantity level is divided into two sub-levels, which are denoted as a first sub-level and a second sub-level, the first sub-level corresponds to a category quantity in a range of (0, 5000] and a similarity threshold such as 0.36; and the second sub-level corresponds to a category quantity in a range of (5000, 10000] and a similarity threshold such as 0.59.

In some embodiments, a second quantity level corresponds to a category quantity in a range of (10000, 20000] and a similarity threshold in a range of 0.61 to 0.64. For example, the second quantity level corresponds to a similarity threshold in a range of 0.61 to 0.63, or 0.61 to 0.62. For example, the second quantity level corresponds to a similarity threshold of 0.62.

In some embodiments, a third quantity level corresponds to a category quantity of (20000, 30000], and a similarity threshold in a range of 0.65 to 0.664. For example, the third quantity level corresponds to a similarity threshold in a range of 0.655 to 0.659, or 0.66 to 0.662. For example, the third quantity level corresponds to a similarity threshold of 0.66.

In some embodiments, a fourth quantity level corresponds to a category quantity in a range of (30000, 50000] and a similarity threshold in a range of 0.665 to 0.70. For example, the fourth quantity level corresponds to a similarity threshold in a range of 0.665 to 0.68. For example, the fourth quantity level corresponds to a similarity threshold of 0.67.

In some embodiments, a fifth quantity level corresponds to a category quantity in a range of (50000, ∞), and a similarity threshold in a range of 0.705 to 0.9. For example, the fifth quantity level corresponds to a similarity threshold in a range of 0.71 to 0.75, For example, the fifth quantity level corresponds to a similarity threshold of 0.72.

In step S02, a similarity between the face image to be clustered and an image(s) of at least one image category in the image category library is acquired, and it is judged, according to a current similarity threshold and the similarity, whether there is an image of the same category as the face image to be clustered in the image category library. When there is an image of the same category as the face image to be clustered in the image category library, it proceeds to step S021, that is, determining a category label of the face image to be clustered according to a category label of the image of the same category as the face image to be clustered. When there is no image of the same category as the face image to be clustered in the image category library, it proceeds to step S022, that is, assigning a category label to the face image to be clustered according to a first preset rule.

In some embodiments, step S02 specifically includes steps S02a to S02c.

In step S02a, a comparison sequence of comparing images of various categories in the image category library with the face image to be clustered is determined.

In some embodiments, the comparison sequence may be determined according to the category label of each image category. As described above, the category label includes a category serial number, and in this case, the comparison sequence of comparing each image category with the face image to be clustered may be determined according to the category serial number of each image category.

In step S02b, at least one comparison step is performed according to the comparison sequence, where an $i^{th}$ comparison step includes: calculating a similarity between an image(s) of an $i^{th}$ image category in the comparison sequence in the image category library and the face image to be clustered, and determining, when the similarity between the image of the $i^{th}$ image category in the comparison sequence in the image category library and the face image to be clustered is greater than or equal to the similarity threshold, the image of the $i^{th}$ image category in the comparison sequence in the image category library to be the image of the same category as the face image to be clustered. When the similarity between the image of the $i^{th}$ image category in the comparison sequence in the image category library and the face image to be clustered is less than the similarity threshold, a next comparison step is performed.

In this case, 'i' is an integer greater than zero and less than or equal to the quantity of current image categories in the image category library.

For example, a similarity between the face image to be clustered and an image of an image category with a category serial number "00001" is calculated. If the similarity between the face image to be clustered and the image of the image category with the category serial number "00001" is greater than or equal to the similarity threshold, it is determined that the image of the image category with the category serial number "00001" is the image of the same category as the face image to be clustered; otherwise, a similarity between the face image to be clustered and an image of an image category with a category serial number "00002" is further calculated. If the similarity between the face image to be clustered and the image of the image category with the category serial number "00002" is greater than or equal to the similarity threshold, it is determined that the image of the image category with the category serial number "00002" is the image of the same category as the face image to be clustered. If the similarity between the face image to be clustered and the image of the image category with the category serial number "00002" is less than the similarity threshold, a similarity between the face image to be clustered and an image of an image category with a category serial number "00003" is further calculated, so on and so forth, until the image of the same category as the face image to be clustered is determined, or until it is determined that there is no image of the same category as the face image to be clustered in the image category library.

In the $i^{th}$ comparison step, the calculating the similarity between the image of the $i^{th}$ image category in the comparison sequence in the image category library and the face image to be clustered specifically includes: acquiring a feature vector of the image of the $i^{th}$ image category in the comparison sequence in the image category library as a first feature vector; and acquiring a feature vector of the face image to be clustered as a second feature vector; and then determining, according to a similarity between the first feature vector and the second feature vector, the similarity between the image of the $i^{th}$ image category in the comparison sequence in the image category library and the face image to be clustered.

Specifically, the similarity between the first feature vector and the second feature vector may be a cosine similarity.

In some embodiments, step S021 specifically includes: setting the category label of the face image to be clustered to be the same as the category label of the image of the same category.

In some embodiments, step S022 specifically includes: adding 1 to the quantity of current image categories in the image category library to obtain a category serial number (i.e., a category label) of the face image to be clustered.

In some embodiments, the clustering of the image to be clustered further includes: proceeding to step S023 when there is no image of the same category as the face image to be clustered in the image category library, where in step S023, the face image to be clustered is added into the image category library. The sequence of steps S022 and S023 is not particularly limited.

In some examples, when there is an image of the same category as the face image to be clustered in the image category library, the face image to be clustered is not added into the image category library. In this way, during the process of gradually increasing the image categories in the image category library, there is always only one face image in each category.

Figure 3:
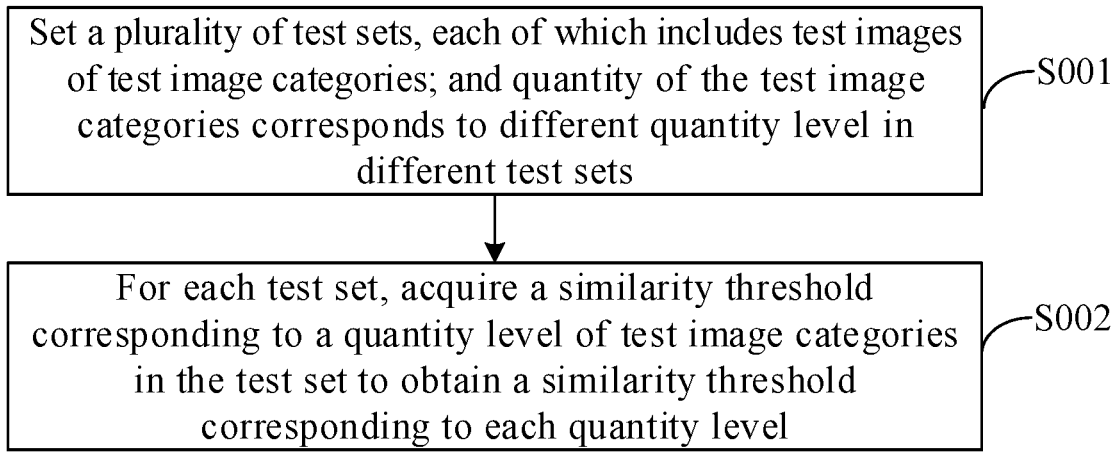
FIG. 3 is a flowchart of establishing correspondence relations between different quantity levels and similarity thresholds according to an embodiment of the present disclosure.

In some embodiments, the face clustering method further includes: establishing, before acquiring a first face image to be clustered, correspondence relations between different quantity levels and similarity thresholds. FIG. 3 is a flowchart of establishing correspondence relations between different quantity levels and similarity thresholds according to an embodiment of the present disclosure. As shown in FIG. 3, the process of establishing the correspondence relations between different quantity levels and similarity thresholds includes the following steps S001 to S002.

In step S001, a plurality of test sets are set, and each of the test sets includes test images of a plurality of test image categories. In different test sets, a quantity of the test image categories corresponds to different quantity levels.

In some embodiments, except for the test set corresponding to the highest quantity level, the quantity of test image categories in each of the remaining test sets is an upper limit value of the corresponding quantity level.

For example, a first quantity level corresponds to a category quantity in a range of (0, 10000]; a second quantity level corresponds to a category quantity in a range of (10000, 20000]; a third quantity level corresponds to a category quantity in a range of (20000, 30000); a fourth quantity level corresponds to a category quantity in a range of (30000, 50000); and a fifth quantity level corresponds to a category quantity in a range of (50000, ∞). Accordingly, except for the test set corresponding to the fifth quantity level, the quantities of test image categories in the remaining test sets are respectively 10000, 20000, 30000 and 50000; and in the test set corresponding to the fifth quantity level, the quantity of test image categories may be 50000 to 60000.

In step S002, for each test set, a similarity threshold corresponding to a quantity level of test image categories in the test set is acquired to obtain a similarity threshold corresponding to each quantity level.

Figure 4:
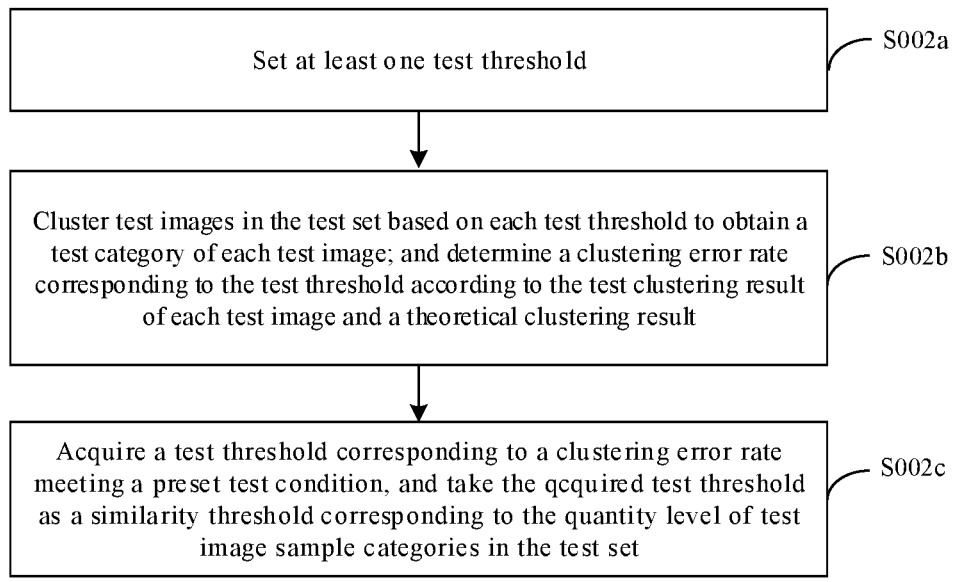
FIG. 4 is a schematic flowchart of an image classification storage method according to some embodiments of the present disclosure.

FIG. 4 is a schematic flowchart of acquiring a similarity threshold corresponding to a test set according to some embodiments of the present disclosure. As shown in FIG. 4, the step of acquiring the similarity threshold corresponding to the test set includes the following steps S002a to S002c.

In step S002a, at least one test threshold is set.

In step S002b, test images in the test set are clustered based on each test threshold to obtain a test clustering result of test images; and a clustering error rate corresponding to the test threshold is deteremined according to the test clustering result of each test image and a theoretical clustering result.

In some embodiments, the step of clustering an $a^{th}$ test image in the test set includes: calculating a similarity between the $a^{th}$ test image and each remaining test image; when the calculated similarity between the $a^{th}$ test image and a $b^{th}$ test image is greater than or equal to a current test threshold, determining that the $a^{th}$ test image is successfully matched with the $b^{th}$ test image (i.e., the $a^{th}$ test image and the $b^{th}$ test image belong to the same category); and when the calculated similarity between the $a^{th}$ test image and a $b^{th}$ test image is less than a current test threshold, determining that the $a^{th}$ test image is failed to be matched with the $b^{th}$ test image (i.e., the $a^{th}$ test image and the $b^{th}$ test image do not belong to the same category).

The clustering error rate is a parameter indicating a degree of clustering error.

It will be appreciated that the test clustering result of the test image refers to that, after calculating the similarity between the test image and each remaining test image, whether the test image is successfully matched with each remaining test image. The theoretical clustering result of the test image refers to whether the test image should be successfully matched with each remainder test image in theory. A theoretical category label may be preset for each test image to determine the theoretical clustering result of the test image. It will be appreciated that, in theory, test images with the same category labels should match each other successfully.

In some embodiments, the clustering error rate includes: a false accept rate (FAR) and a false reject rate (FRR).

The false accept rate is a rate at which test images of different categories are mistakenly regarded as a same category. The false reject rate is a rate at which test images of a same category are mistakenly regarded as different categories.

The false accept rate=(NFA/NIRA)×100%. NFA is a sum number of "false acceptances" of all test images. For example, there are three categories of test images, and the test images are respectively denoted as test image A to test image F. Test images A to B each have a category label "01", test images C to D each have a category label "02", and test images E to F each have a category label "03". Assuming that after calculating the similarity between the test image A and each remaining test image, it is obtained that the similarity thresholds between the test image A and the test image B and between the test image A and the test image C are both greater than the test threshold, and the similarity threshold between the test image A and each of the test images D to F is less than the test threshold, then it indicates that one "false acceptance" occurs on the test image A (because the test image A is mistakenly regarded as the same category as the test image C). By analogy, after each test image is clustered, the number of "false acceptances" of the test image can be obtained, and the sum number of "false acceptances" of all the test images is the NFA as mentioned above. NIRA is a total number of inter-category matches. For example, the test images are divided into M1 categories, each including N1 test images, then NIRA=M1×N1×(M1−1)×N1.

False reject rate=(NFR/NGRA)×100%. NFR is a sum number of "false rejections" of all test images. For example, there are three categories of test images, and the test images are respectively denoted as test image A to test image F. Test images A to B each have a category label "01", test images C to D each have a category label "02", and test images E to F each have a category label "03". Assuming that after calculating the similarity between the test image B and each remaining test image, it is obtained that the similarity between the test image B and each remaining test image is less than the test threshold, then it indicates that one "false rejection" occurs on the test image B (because the test image B is mistakenly regarded as a different category from the test image A). By analogy, after each test image is clustered, the number of "false rejections" of the test image can be obtained, and the sum number of "false rejections" of all the test images is the NFR as mentioned above. NGRA is a total number of intra-category matches. For example, the test images are divided into M1 categories, each including N1 test images, then NGRA=M1×N1×(N1−1).

For example, a test set includes 110 categories of test images, each including 8 test images. Assume that during the clustering of the test images, there are 1000 "false acceptances" and 160 "false rejections" in total, then the total number of inter-category matches is 110×8×109×8=767360, the total number of intra-category matches is 110×8×7=6160, the false accept rate is 1000/767360*100%=0.13%, and the false reject rate is 160/6160=2.6%.

In step S002c, a test threshold corresponding to a clustering error rate meeting a preset test condition is acquired, and the acquired test threshold is regarded as a similarity threshold corresponding to the quantity level of categories of test image samples in the test set.

In some embodiments, the preset test condition includes a condition that the false reject rate is equal to the false accept rate.

An embodiment of the present disclosure further provides an image classification storage method applied to an electronic device including an image capturing unit. For example, the electronic device may be a mobile phone, a computer, or other terminals. For another example, the electronic device is an access control device having an image capturing unit.

Figure 5:
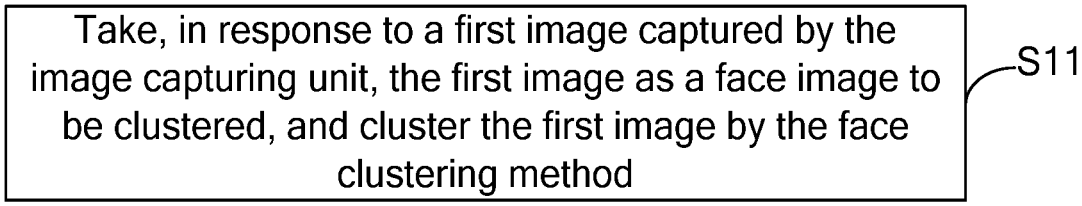
FIG. 5 is a schematic flowchart of an image classification storage method according to some other embodiments of the present disclosure.

FIG. 5 is a schematic flowchart of an image classification storage method according to some embodiments of the present disclosure. As shown in FIG. 5, the image classification storage method includes the following step S11.

In step S11, in response to a first image captured by the image capturing unit, the first image is taken as a face image to be clustered, and clustered by the face clustering method as described above.

In an example, the image capturing unit may capture a video in real time, and the first image is a face image from a video captured by the image capturing unit. Each captured first image is taken as the face image to be clustered on which steps S01 and S02 are performed. FIG. 5 is a schematic flowchart of an image classification storage method according to some embodiments of the present disclosure.

Figure 6:
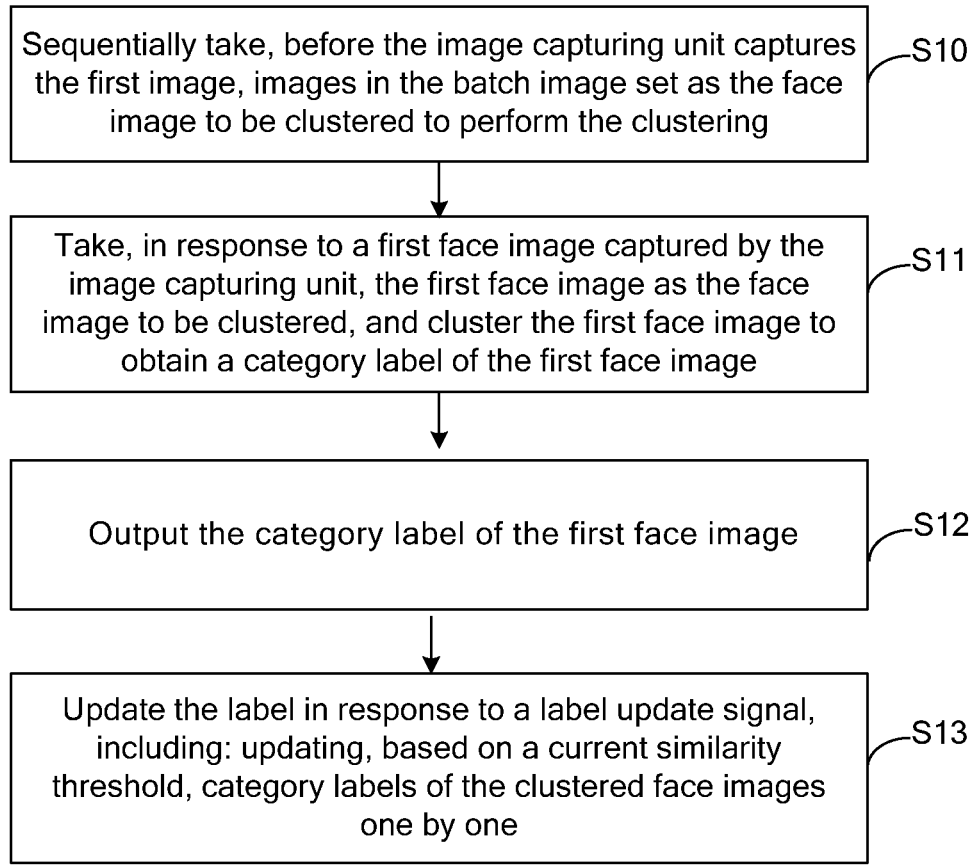
FIG. 6 is a schematic flowchart of an image classification storage method according to some other embodiments of the present disclosure.

FIG. 6 is a schematic flowchart of an image classification storage method according to some other embodiments of the present disclosure. As shown in FIG. 6, before the image capturing unit captures the first image, a batch image set is stored in the electronic device.

As shown in FIG. 6, the image classification storage method includes the following steps S10 to S13.

In step S10, before the image capturing unit captures the first image, images in the batch image set are sequentially taken as the face image to be clustered to perform the clustering.

In an example, before the clustering of the images in the batch image set, there may be no image in the image category library; and after the images in the batch image set are sequentially clustered in the above steps S01 and S02, an initialized image category library including multiple categories of images is obtained. In this case, when a first image in the batch image set is clustered, there is no image in the image category library, and thus there is no image of the same category as the image to be clustered in the image category library. Therefore, a category label is assigned to the first image in the batch image set, and then the first image in the batch image set is added to the image category library.

In step S11, in response to a first face image captured by the image capturing unit, the first face image is taken as the face image to be clustered, and is clustered by the above steps S01 and S02 to obtain a category label of the first face image.

In step S12, the category label of the first face image is output.

In addition, in practical applications, images of the same category may be stored in the same folder, and images of different categories may be stored in different folders.

In step S13, in response to a label update signal, a label update step is performed, in which category labels of the clustered face images are updated one by one based on a current similarity threshold.

The clustered face image refer to a face image of which a category label has been obtained. For example, the clustered face image includes a face image already in the image category library, and further includes a face image that has been clustered but not added into the image category library yet.

In some embodiments, the label update signal may be a signal generated by an electronic device under a preset condition. For example, the electronic device generates a label update signal when the image capturing unit has captured a certain quantity of first face images. For another example, the electronic device generates a label update signal when the physical time reaches a preset time (e.g., 2 A.M. every Monday).

Accordingly, the sequence of steps S13 and S11 is not limited in the embodiments of the present disclosure. For example, after the category update for each image in the image category library is completed, the step S11 is performed again when the image capturing unit captures a new first face image.

During the label update, the category label is updated based on a current similarity threshold and a similarity between the face image with a label to be updated and at least one face image category with an updated label.

It will be appreciated that the current similarity threshold is a similarity threshold corresponding to the quantity level of current image categories in the image category library. In addition, the electronic device may generate label update signals at a plurality of time points, and the label is updated each time a label update signal is generated. The similarity threshold remains unchanged in a same process of label update.

In some embodiments, the step of updating the category label of any clustered face image includes: judging, according to the current similarity threshold and a similarity between the face image with a label to be updated and an image of at least one face image category with an updated label, whether an image of the same category as the face image with a label to be updated is present in the face image category with an updated label. When the image of the same category as the face image with a label to be updated is present in the face image category with an updated label, a new category label of the face image with a label to be updated is determined according to a category label of the image of the same category as the face image with a label to be updated; and when the image of the same category as the face image with a label to be updated is not present in the face image category with an updated label, a new category label is assigned to the face image with a label to be updated according to a second preset rule.

It will be appreciated that when the category label of a certain clustered face image is to be updated, the face image is a "face image with a label to be updated".

When the similarity between a face image with an updated label and a face image with a label to be updated is greater than or equal to the current similarity threshold, the face image with an updated label may be regarded as the image of the same category as the face image with a label to be updated.

In some embodiments, category labels of the clustered face images are updated one by one according to a first sequence, which is the sequence for the clustered face images to obtain category labels. The category label includes a category serial number. In this case, the assigning the new category label to the face image with a label to be updated according to the second preset rule specifically includes: adding 1 to a total quantity of current face image categories with an updated label to obtain the new category label of the face image with a label to be updated.

In some embodiments, the label update step performed in response to the label update signal may be regarded as a process of:

establishing an update image library which is an empty set at an initial time point of receiving the label update signal; and then, updating the category labels of the face images which are clustered one by one according to the first sequence. The process of updating the category label of any clustered face image includes: judging, according to the current similarity threshold and a similarity between the face image with a label to be updated and an image of at least one image category in the update image library, whether an image of the same category as the face image with a label to be updated is present in the update image library; when the image of the same category as the face image with a label to be updated is present in the update image library, taking the category label of the image of the same category as the new category label of the face image with a label to be updated; and otherwise, adding 1 to a total quantity of face image categories in the update image library to obtain the new category label of the face image with a label to be updated. When the category labels of all clustered face images are updated, the image category library is replaced with the update image library.

By updating the category labels of the clustered face images, the clustering accuracy of various images can be improved.

Figure 7:
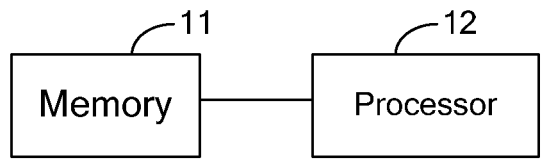
FIG. 7 is a schematic diagram of an image clustering apparatus according to some embodiments of the present disclosure.

FIG. 7 is a schematic diagram of an image clustering apparatus provided in some embodiments of the present disclosure. As shown in FIG. 7, the image clustering apparatus includes a memory 11 and a processor 12. The memory 11 has a computer program stored therein which, when executed by the processor 12, causes the face clustering method in any of the above embodiments to be implemented.

The present disclosure further provides a computer-readable storage medium having a computer program stored therein which, when executed by a processor, causes the face clustering method or the image classification storage method as described above to be implemented.

Figure 8:
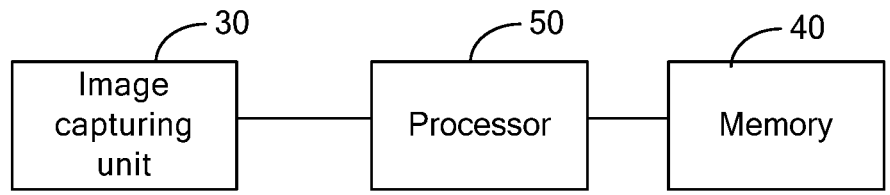
FIG. 8 is a schematic diagram of an electronic device according to some embodiments of the present disclosure.

FIG. 8 is a schematic diagram of an electronic device provided in some embodiments of the present disclosure. As shown in FIG. 8, the electronic device includes: an image capturing unit 30, a memory 40 and a processor 50. The image capturing unit 30 includes a device for image capturing, such as a camera. The memory 40 stores a computer program therein which, when executed by the processor 50, causes the image classification storage method as described above to be implemented.

The memory and the computer-readable storage medium include, but are not limited to: a random access memory (RAM), a read only memory (ROM), a non-volatile random access memory (NVRAM), a programmable read only memory (PROM), an erasable programmable read only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other non-transitory media. Examples of the processor include, but are not limited to, general purpose processors, central processing units (CPUs), microprocessors, digital signal processors (DSPs), controllers, microcontrollers, state machines, and the like.

It will be appreciated that the above implementations are merely exemplary implementations for the purpose of illustrating the principle of the present disclosure, and the present disclosure is not limited thereto. Various modifications and improvements can be made by a person having ordinary skill in the art without departing from the protection scope of the disclosure defined in the accompany claims, and accordingly, all of these modifications and improvements fall into the protection scope of the present disclosure.

What is claimed is:

1. A face clustering method, comprising acquiring and clustering a face image to be clustered, the clustering comprising:
acquiring a similarity threshold corresponding to a quantity level of current image categories in an image category library, wherein at least two different quantity levels correspond to different similarity thresholds;
acquiring a similarity between the face image to be clustered and an image of at least one image category in the image category library;
judging, according to a current similarity threshold and the similarity, whether there is an image of the same category as the face image to be clustered in the image category library; determining, when there is the image of the same category as the face image to be clustered in the image category library, a category label of the face image to be clustered according to a category label of the image of the same category as the face image to be clustered; and assigning, when there is no image of the same category as the face image to be clustered in the image category library, the category label to the face image to be clustered according to a first preset rule,
wherein the acquiring the similarity threshold corresponding to the quantity level of current image categories in the image category library comprises:
judging whether the quantity level of image categories in the image category library is changed; adopting, when the quantity level of image categories in the image category library is not changed, a similarity threshold used when a previous face image to be clustered is clustered; and updating, when the quantity level of image categories in the image category library is changed, the similarity threshold according to the changed quantity level.

2. The face clustering method according to claim 1, wherein the similarity threshold is positively correlated with the quantity level of current image categories in the image category library.

3. The face clustering method according to claim 1, wherein when there is no image of the same category as the face image to be clustered in the image category library, the clustering further comprises:
adding the face image to be clustered into the image category library.

4. The face clustering method according to claim 1, wherein each category in the image category library comprises one image, and
the acquiring the similarity between the face image to be clustered and the image of at least one image category in the image category library and the judging whether there is the image of the same category as the face image to be clustered in the image category library according to the current similarity threshold and the similarity, comprise:
determining a comparison sequence of comparing images of respective image categories in the image category library with the face image to be clustered; and
performing at least one comparison step according to the comparison sequence, wherein an $i^{th}$ comparison step comprises: calculating a similarity between an image of an $i^{th}$ image category in the comparison sequence in the image category library and the face image to be clustered, and determining, when the similarity between the image of the $i^{th}$ image category in the comparison sequence in the image category library and the face image to be clustered is greater than or equal to the similarity threshold, the image of the $i^{th}$ image category in the comparison sequence in the image category library as the image of the same category as the face image to be clustered; and performing a next comparison step when the similarity between the image of the $i^{th}$ image category in the comparison sequence in the image category library and the face image to be clustered is less than the similarity threshold;
wherein i is an integer greater than zero and less than or equal to the quantity of current image categories in the image category library.

5. The face clustering method according to claim 4, wherein the calculating the similarity between the image of the $i^{th}$ image category in the comparison sequence in the image category library and the face image to be clustered comprises:
acquiring a feature vector of the image of the $i^{th}$ image category in the comparison sequence in the image category library as a first feature vector;
acquiring a feature vector of the face image to be clustered as a second feature vector; and
determining, according to a similarity between the first feature vector and the second feature vector, the similarity between the image of the $i^{th}$ image category in the comparison sequence in the image category library and the face image to be clustered.

6. The face clustering method according to claim 1, wherein
a first quantity level corresponds to a category quantity in a range of (0, 10000], and a similarity threshold in a range of 0.3 to 0.6;
a second quantity level corresponds to a category quantity in a range of (10000, 20000], and a similarity threshold in a range of 0.61 to 0.64;
a third quantity level corresponds to a category quantity in a range of (20000, 30000], and a similarity threshold in a range of 0.65 to 0.664;
a fourth quantity level corresponds to a category quantity in a range of (30000, 50000], and a similarity threshold in a range of 0.665 to 0.70; and
a fifth quantity level corresponds to a category quantity in a range of (50000, ∞), and a similarity threshold in a range of 0.705 to 0.9.

7. The face clustering method according to claim 1, wherein the category label comprises a category serial number; and
the assigning the category label to the face image to be clustered according to the first preset rule comprises:
adding 1 to the quantity of current image categories in the image category library to obtain a category serial number of the face image to be clustered.

8. The face clustering method according to claim 1, wherein the face clustering method further comprises: establishing, before acquiring a first face image to be clustered, correspondence relations between different quantity levels and similarity thresholds;
wherein the establishing the correspondence relations between different quantity levels and similarity thresholds comprises:
setting a plurality of test sets, each of which comprises test images of a plurality of test image categories, wherein a quantity of the test image categories corresponds to different quantity levels in different test sets; and for each of the test sets, performing steps of:

setting at least one test threshold;

clustering the test images in the test set based on each test threshold to obtain test clustering results of the test images, and determining a clustering error rate corresponding to the test threshold according to the test clustering result of each test image and a theoretical clustering result; and acquiring a test threshold corresponding to a clustering error rate meeting a preset test condition, and taking the acquired test threshold as a similarity threshold corresponding to the quantity level of test image categories in the test set.

9. The face clustering method according to claim 8, wherein the clustering error rate comprises: a false accept rate and a false reject rate.

10. The face clustering method according to claim 9, wherein the preset test condition comprises a condition that the false reject rate is equal to the false accept rate.

11. The face clustering method according to claim 8, wherein except for the test set corresponding to the highest quantity level, the quantity of test image categories in each of the remaining ones of the test sets is an upper limit value of the corresponding quantity level.

12. An image classification storage method applied to an electronic device comprising an image capturing unit, the image classification storage method comprising:

in response to a first face image captured by the image capturing unit, taking the first face image as a face image to be clustered, and clustering the first face image by the face clustering method according to claim 1 to obtain a category label of the first face image.

13. The image classification storage method according to claim 12, wherein the image classification storage method further comprises:

outputting the category label of the first face image.

14. The image classification storage method according to claim 12, wherein before the image capturing unit captures the first face image, a batch image set is stored in the electronic device; and the image classification storage method further comprises:

before the image capturing unit captures the first face image, sequentially taking face images in the batch image set as the face image to be clustered to perform the clustering.

15. The image classification storage method according to claim 12, wherein the image classification storage method further comprises:

in response to a label update signal, updating category labels of the clustered face images one by one based on a current similarity threshold.

16. The image classification storage method according to claim 15, wherein the updating the category label of the clustered face images comprises, for each clustered face image:

judging, according to the current similarity threshold and a similarity between the face image with a label to be updated and an image of at least one face image category with an updated label, whether an image of the same category as the face image with a label to be updated is present in the face image category with an updated label; determining, when the image of the same category as the face image with a label to be updated is present in the face image category with an updated label, a new category label of the face image with a label to be updated according to a category label of the image of the same category as the face image with a label to be updated; and assigning, when the image of the same category as the face image with a label to be updated is not present in the face image category with an updated label, a new category label to the face image with a label to be updated according to a second preset rule, wherein the similarity threshold remains unchanged during update of category labels of the clustered face images one by one.

17. The image classification storage method according to claim 16, wherein the category label comprises a category serial number; and category labels of the clustered face images are updated one by one according to a first sequence in which the clustered face images obtain category labels; and the assigning the new category label to the face image with a label to be updated according to the second preset rule comprises:

adding 1 to a total quantity of current face image categories with an updated label to obtain the new category label of the face image with a label to be updated.

18. A face clustering apparatus, comprising: a memory and a processor, wherein the memory has a computer program stored therein, and the computer program causes the face clustering method according to claim 1 to be implemented when it is executed by the processor.

19. An electronic device, comprising:

an image capturing unit;

a memory and a processor, wherein the memory has a computer program stored therein, and the computer program causes the image classification storage method according to claim 12 to be implemented when it is executed by the processor.

* * * * *